Patented Mar. 12, 1940

2,193,613

UNITED STATES PATENT OFFICE 2,193,613

POLYVINYL HALIDE COMPOSITIONS

Claude H. Alexander, Cuyahoga Falls, Ohio, assignor to The B. F. Goodrich Company, New York, N. Y., a corporation of New York No Drawing. Application March 18, 1937,
Serial No. 131,661

8 Claims. (Cl. 260—36)

This invention relates to polyvinyl halide compositions and has as its principal object to provide plasticized polyvinyl halide compositions containing plasticizers which improve the dielectric properties of compositions in which they are used.

Polyvinyl halides are ordinarily mixed with a considerable proportion of a plasticizer in order to enhance the workability and plasticity of the composition when hot and its flexibility or resilience when cold. However, the plasticizers heretofore suggested impart more or less undesirable electrical properties to the compositions, particularly when used in large proportions. The plasticizers of this invention are excellent dielectrics and when substituted for previously suggested plasticizers they bring about remarkable improvements in the properties of the polyvinyl halide compositions. They are particularly advantageous when employed in compositions of the type described in U. S. Patent No. 1,929,453 issued to Waldo L. Semon, containing the completely polymerized or gamma polymer of vinyl chloride and sufficient plasticizer to produce a resilient composition.

I have discovered that the members of the class of compounds having the structural formula X—A—R wherein X represents halogen or hydrogen, A represents a naphthalene or biphenyl nucleus, and R represents an aliphatic, or alicyclic hydrocarbon group containing not more than six carbon atoms, are excellent plasticizers which impart improved dielectric properties to compositions in which they are used. The expression "naphthalene or biphenyl nucleus" as used in the specification and claims signifies the residue obtained by removing only two hydrogens from a naphthalene or biphenyl molecule. The following members of this class of compounds are representative of the plasticizers included in this invention: 1-amyl naphthalene; 2-amyl naphthalene; 2-cyclohexyl naphthalene; 1-amyl, 4-chloronaphthalene; 1-ethyl, 2-chloro naphthalene; 1-amyl biphenyl; 2-isopropyl biphenyl; 1-cyclohexyl biphenyl; 1-amyl, 4-bromobiphenyl and 1-propyl, 2-chlorobiphenyl. Since it is easier and cheaper to make isomeric mixtures of most of these compounds than to produce them in pure form, such mixtures are usually used. For instance, since 1-amyl naphthalene and 2-amyl naphthalene are both excellent plasticizers, I usually plasticize my composition with a mixture of the two. The above compounds are selected merely for illustrative purposes, and others within the class defined in this invention are equally satisfactory plasticizers. When the side chain contains more than six carbon atoms, the length of the side chain reduces the solubility of the polyvinyl halides in the compounds to such an extent that they are no longer satisfactory plasticizers.

The plasticizer may be incorporated in the composition by any of the well known methods. The polyvinyl halide may be dissolved in the plasticizer at elevated temperatures. For instance, gamma polyvinyl chloride may be dissolved in 2-amyl naphthalene at about 120° C. The plasticizer may be added to the composition on a heated roll-mill, or the mixing may be done in an internal mixer.

I usually combine from one-half to four parts by weight of plasticizer with one part of polyvinyl halide, though in some instances greater or less amounts may be used. Carbon black, clay, barytes, zinc oxide, wood flour, and other pigments and fillers commonly used in the rubber and plastics industries may be included in the compositions.

Of the ordinary commercial plasticizers I have tested, tricresyl phosphate imparts to polyvinyl halide compositions the best dielectric properties. To illustrate the superiority of the plasticizers of this invention, I will show the results obtained from electrical tests on compositions containing tricresyl phosphate and two of the plasticizers of my invention.

| Composition | A | B | C |
|---|---|---|---|
| Gamma polyvinyl chloride | 62 | 62 | 62 |
| Tricresyl phosphate | 38 | | |
| 1-amyl naphthalene | | 38 | |
| 1-amyl, 4-chloronapthalene | | | 38 |

| | Power factor (percent) at 1000 cycles | | | | |
|---|---|---|---|---|---|
| Temperature | 30 | 40 | 50 | 60 | 70 |
| Composition: | | | | | |
| A | 14.3 | 13.4 | 10.4 | 13.4 | 17.1 |
| B | 9.32 | 7.96 | 6.07 | 5.79 | 7.27 |
| C | 9.09 | 9.26 | 8.92 | 8.02 | 9.21 |

| | Dielectric constant at 1000 cycles | | | | |
|---|---|---|---|---|---|
| Temperature | 30 | 40 | 50 | 60 | 70 |
| Composition: | | | | | |
| A | 5.80 | 6.61 | 8.50 | 8.94 | 9.14 |
| B | 4.60 | 4.96 | 5.51 | 5.85 | 5.95 |
| C | 4.51 | 5.06 | 5.85 | 6.53 | 6.78 |

| | D. C. insulation resistance (K × 10$^4$ megohms/mile) | | |
|---|---|---|---|
| Temperature | 30.5 | 50 | 70 |
| Composition: | | | |
| A | 9,460 | 582 | 70 |
| B | 15,150 | 3,290 | 430 |
| C | 17,850 | 3,460 | 311 |

It is obvious from the results of these tests that the dielectric properties of these compositions are greatly improved by the use of the plasticizers of this invention. Furthermore, the compositions exhibit an outstandingly high degree of strength and resiliency and are unusually resistant to deterioration and to the effects of corrosive chemicals.

Although I have herein disclosed specific embodiments of my invention, I do not limit myself wholly thereto, for many modifications such as the substitution of equivalent materials and the variation of proportions used are within the spirit and scope of the invention as defined in the appended claims.

I claim:

1. The method which comprises plasticizing gamma polyvinyl chloride with a compound having the structural formula X—A—R wherein X represents a member of the class consisting of halogen and hydrogen, A represents a member of the class consisting of naphthalene and biphenyl nuclei, and R represents a member of the class consisting of aliphatic and alicyclic hydrocarbon groups containing not more than six carbon atoms.

2. The method which comprises plasticizing gamma polyvinyl chloride with amyl naphthalene.

3. The method which comprises plasticizing gamma polyvinyl chloride with amyl chloronaphthalene.

4. The method which comprises plasticizing gamma polyvinyl chloride with cyclohexyl naphthalene.

5. A plasticized composition comprising gamma polyvinyl chloride and a compound having the structural formula X—A—R wherein X represents a member of the class consisting of halogen and hydrogen, A represents a member of the class consisting of naphthalene and biphenyl nuclei, and R represents a member of the class consisting of aliphatic and alicyclic hydrocarbon groups containing not more than six carbon atoms.

6. A plasticized composition comprising gamma polyvinyl chloride and amyl naphthalene.

7. A plasticized composition comprising gamma polyvinyl chloride and cyclohexyl naphthalene.

8. A plasticized composition comprising gamma polyvinyl chloride and amyl chloronaphthalene.

CLAUDE H. ALEXANDER.